(No Model.)
P. LETTRÉ.
BRACELET.
No. 331,798. Patented Dec. 8, 1885.
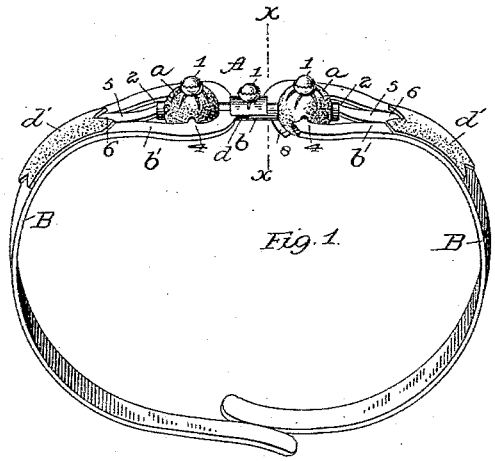
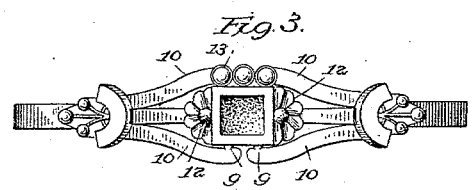
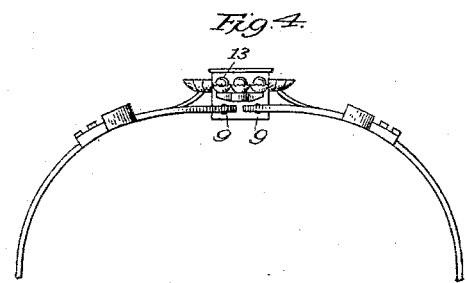
Attest:
Walter Donaldson
F. L. Middleton
Inventor
Philipp Lettré
by Joyce & Spear
Attys.

UNITED STATES PATENT OFFICE.

PHILIPP LETTRÉ, OF ATTLEBOROUGH, MASSACHUSETTS, ASSIGNOR TO T. I. SMITH & CO., OF SAME PLACE.

BRACELET.

SPECIFICATION forming part of Letters Patent No. 331,798, dated December 8, 1885.

Application filed May 8, 1884. Serial No. 130,735. (No model.)

*To all whom it may concern:*

Be it known that I, PHILIPP LETTRÉ, of Attleborough, in the county of Bristol and State of Massachusetts, have invented a new and useful Improvement in Bracelets; and I do hereby declare that the following is a full, clear, and exact description of the same.

My invention relates to bracelets of that class in which the wings are pivoted or flexibly attached to the central ornament, with a spring for closing the wings and holding them in closed position.

My invention consists, essentially, of a spring or springs approximately straight and fastened either to the heads or wings, with suitable bearings on head or wings, in order to give the required elasticity to the wings.

It consists, further, of details of construction hereinafter explained.

In the accompanying drawings I have shown two forms of the bracelet; but the general principle of construction is the same in both.

The designs may be varied indefinitely without departing from these general principles.

Figure 1 is a perspective view of one form of bracelet. Fig. 2 is a section on line $x\ x$. Fig. 3 is a top view of a modification. Fig. 4 is a side elevation of a portion of the modified form shown in Fig. 3.

In the form shown in Fig. 1 the central head or ornamental piece, A, consists of two globes, $a\ a$, connected by a bar, $b$. The globes and the bar may have any suitable ornamentation, 1 1 1. The globes have small holes at 2 2, preferably surrounded by a plunger, these holes being on the outer sides in line with the connecting-bar. The wings B B are formed with loops $b'\ b'$, which inclose the globes, but are cut away, as shown at 3 3, to admit the connecting-bar between the globes. These wings are pivoted upon the globes by means of small spurs 4, preferably cut from the metal out of which the wings are formed. These spurs enter holes made laterally in the globes, and thus form the pivots on which the wings turn. Flat springs 5 5 are attached to the wings between the arms or within the loops, as shown at 6, and their free ends enter the holes 2 2, in which holes they may slide freely as the wings are opened or closed. The ornament on the connecting-bar is brought down on each side of the bar, as shown at $d$, and forms a bearing for the cut-away ends 7 7 of the bracelets, these ends resting against the bearing when the bracelet is closed. Stops 8 8 on the globes underneath the wings limit the movement of the wings in opening. Ornamental pieces $d'\ d'$ cover the ends of the springs where they are soldered to the wings.

In the form shown in Fig. 3 the central ornament, of which the wings are pivoted, is of different form, being in the shape of a rectangular box, and the pivots formed on the wings in the same manner turn in holes in the sides of the box, as shown at 9 9. The wings are in this case formed with arms 10, instead of being made in loop form, as in the first form described. The ends of the springs are fastened to the wings, in the forks thereof, as in the first form described, and are covered in the same way, but with a different kind of ornament. The free ends of the springs have their bearings underneath the ornamental projection 12 on each side of the box, and other suitable ornaments, 13, are placed upon the central piece over the forked ends. This serves to limit the movement of the wings in both directions. The springs are made of solid or rolled gold, or any other suitable ornamental metal, and they form springs, and serve also as part of the bracelet.

The springs are shown as flat; but they may be in any form of cross-section.

It is apparent that the form and construction of the wings in other respects than those indicated in the claims and the ornamentation and the shape of the central piece may be indefinitely varied.

No coiled springs are used in the construction, and only approximately straight springs are employed.

It is obvious that the fixing of the springs may be reversed, the free ends resting on the wings.

I claim as my invention—

1. In combination with the wings having loops or arms pivoted on the central part and springs, the stops on the ornamental piece or head for limiting the movement of the wings, substantially as described.

2. The wings pivoted on the central piece or ornament, the springs, and the covering pieces covering the ends of the springs, substantially as described.

In testimony whereof I have signed my name to this specification in the presence of two subscribing witnesses.

PHILIPP LETTRÉ.

Witnesses:
F. H. PURRUCKER,
L. I. MATHEWSON.